(12) United States Patent
Lee

(10) Patent No.: US 10,387,057 B2
(45) Date of Patent: Aug. 20, 2019

(54) MEMORY SYSTEM AND OPERATING METHOD OF MEMORY SYSTEM

(71) Applicant: SK hynix Inc., Gyeonggi-do (KR)

(72) Inventor: Jong-Min Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 103 days.

(21) Appl. No.: 15/407,046

(22) Filed: Jan. 16, 2017

(65) Prior Publication Data

US 2017/0337001 A1 Nov. 23, 2017

(30) Foreign Application Priority Data

May 20, 2016 (KR) ........................ 10-2016-0062270

(51) Int. Cl.
*G06F 3/06* (2006.01)

(52) U.S. Cl.
CPC ............ *G06F 3/0626* (2013.01); *G06F 3/064* (2013.01); *G06F 3/0619* (2013.01); *G06F 3/0644* (2013.01); *G06F 3/0679* (2013.01)

(58) Field of Classification Search
CPC ......... G06F 12/0246; G06F 2212/7205; G06F 12/0253; G06F 3/064; G06F 3/0679; G06F 2212/7203; G06F 3/0688; G06F 2212/7201; G06F 2212/1044; G06F 2212/2022; G06F 3/0608; G06F 2212/214
See application file for complete search history.

(56) References Cited

U.S. PATENT DOCUMENTS

| 2013/0275660 | A1  | 10/2013 | Bennett |
| 2017/0083436 | A1* | 3/2017  | Jung ................... G06F 12/0246 |
| 2017/0242785 | A1* | 8/2017  | O'Krafka ............ G06F 12/0246 |
| 2017/0322847 | A1* | 11/2017 | Park .................... G06F 11/2058 |

FOREIGN PATENT DOCUMENTS

KR            101392174           5/2014

* cited by examiner

*Primary Examiner* — Reginald G Bragdon
*Assistant Examiner* — Thanh D Vo
(74) *Attorney, Agent, or Firm* — IP & T Group LLP

(57) ABSTRACT

A memory system includes: a memory device including a plurality of memory blocks; and a controller including a memory, the controller being suitable for: selecting a source memory block and a target memory block among the plurality of memory blocks; loading map segments of map data for the source memory block on the memory; determining valid pages, among a plurality of pages included in the source memory block, through the map segments; loading valid data stored in the valid pages on the memory; updating map data for the valid data; and storing the valid data and the updated map data in a plurality of pages included in the target memory block.

14 Claims, 10 Drawing Sheets

MEMORY SYSTEM AND OPERATING METHOD OF MEMORY SYSTEM

CROSS-REFERENCE TO RELATED APPLICATION

This application claims priority under 35 U.S.C. § 119 to Korean Patent Application No. 10-2016-0062270 filed on May 20, 2016 in the Korean Intellectual Property Office, the disclosure of which is incorporated herein by reference in its entirety.

TECHNICAL FIELD

Exemplary embodiments of the present invention relate generally to a memory system and, more particularly, to a memory system which processes data with respect to a memory device, and an operating method thereof.

DISCUSSION OF THE RELATED ART

The computer environment paradigm has shifted to ubiquitous computing systems that can be used anytime and anywhere. Due to this, use of portable electronic devices, such as mobile phones, digital cameras, and notebook computers has rapidly increased. These portable electronic devices generally use a memory system having one or more memory devices for storing data, i.e., as a data storage device. The memory system may be used as a main memory device or an auxiliary memory device of the portable electronic devices.

Memory systems using memory devices provide excellent stability, durability, high information access speed, and low power consumption, since they have no moving parts. Examples of memory systems having such advantages include universal serial bus (USB) memory devices, memory cards having various interfaces, and solid state drives (SSD).

SUMMARY

Various embodiments are directed to a memory system capable of minimizing complexity and performance deterioration thereof, and maximizing efficiency in use of a memory device, thus making it possible to rapidly and reliably process data with respect to the memory device, and an operating method thereof.

In an embodiment, a memory system may include: a memory device including a plurality of memory blocks; and a controller including a memory, the controller being suitable for: selecting a source memory block and a target memory block among the plurality of memory blocks, loading map segments of map data for the source memory block on the memory, determining valid pages, among a plurality of pages included in the source memory block, through the map segments, loading valid data stored in the valid pages, on the memory, updating map data for the valid data, and storing the valid data and the updated map data in a plurality of pages included in the target memory block.

The controller may load map segments of second map data for the plurality of pages of the source memory block, and map segments of first map data for the map segments of the second map data, on the memory.

The controller may update, among the map segments of the first map data loaded on the memory, a map segment corresponding to the valid data, and may store the valid data and the updated map segment in the plurality of pages of the target memory block.

The controller may determine the storage of the valid data in the plurality of pages of the target memory block, and may update, in response to the storage of the valid data, a map segment corresponding to the valid data.

The controller may determine the storage of the valid data and the updated map segment to the plurality of pages of the target memory block, and may store, in response to the storage of the valid data and the map segment, map segments of second map data for the plurality of pages of the target memory block, in the plurality of pages of the target memory block.

The controller may determine the map segments of the second map data and the map segments of the first map data that are loaded on the memory, and may determine the valid pages in the source memory block.

The controller may load a first data segment stored in a first valid page among the valid pages, on the memory, and may update a first map segment corresponding to the first data segment, among the map segments of the first map data loaded on the memory.

The controller may store the first data segment loaded on the memory, in a first page of the target memory block, stores the updated first map segment in a second page of the target memory block, and may store a second map segment corresponding to the storage of the first page and the second page, in a third page of the target memory block.

The first page, the second page and the third page may be checkpoints indicating start and completion of the storage of the first data segment from the source memory block to the target memory block.

In the case where, after power off has occurred, the memory system is powered on, the controller may determine, through the checkpoints, whether a second page subsequent to the first valid page, among the plurality of pages of the source memory block, is a valid page.

In an embodiment, an operating method of memory system including a controller and a memory device may include: selecting a source memory block and a target memory block among a plurality of memory blocks included in the memory device; loading map segments of map data for the source memory block on a memory included in the controller; determining, through the map segments, valid pages among a plurality of pages included in the source memory block; loading valid data stored in the valid pages, on the memory; updating map data for the valid data; and storing the valid data and the updated map data, in a plurality of pages included in the target memory block.

The loading of the map segments on the memory may include: loading map segments of second map data for the plurality of pages of the source memory block, on the memory; and loading map segments of first map data for the map segments of the second map data, on the memory.

The updating may include updating, among the map segments of the first map data loaded on the memory, a map segment corresponding to the valid data, and the storing may include storing the valid data and the updated map segment in the plurality of pages of the target memory block.

The updating may include: determining the storage of the valid data in the plurality of pages of the target memory block; and updating, in response to the storage of the valid data, the map segment corresponding to the valid data.

The operating method may further include: determining the storage of the valid data and the updated map segment in the plurality of pages of the target memory block; and storing, in response to the storage of the valid data and the map segment, map segments of second map data for the plurality of pages of the target memory block, in the plurality of pages of the target memory block.

The determining of the valid pages may include determining the map segments of the second map data and the map segments of the first map data that are loaded on the memory, and determining the valid pages in the source memory block.

The loading of the map segments on the memory may include loading a first data segment stored in a first valid page among the valid pages, on the memory, and the updating may include updating a first map segment corresponding to the first data segment, among the map segments of the first map data loaded on the memory.

The storing may include: storing the first data segment loaded on the memory, in a first page of the target memory block; storing the updated first map segment in a second page of the target memory block; and storing a second map segment corresponding to the storage of the first page and the second page, in a third page of the target memory block.

The first page, the second page and the third page may be checkpoints indicating start and completion of the storage of the first data segment from the source memory block to the target memory block.

The operating method may further include: determining, in the case where, after power off has occurred, the memory system is powered on, whether a second page subsequent to the first valid page, among the plurality of pages of the source memory block, is a valid page, through the checkpoints.

BRIEF DESCRIPTION OF THE DRAWINGS

These and other features and advantages of the present invention of the present invention will be described in reference to the accompanying drawings, wherein.

DETAILED DESCRIPTION

Figure 1:
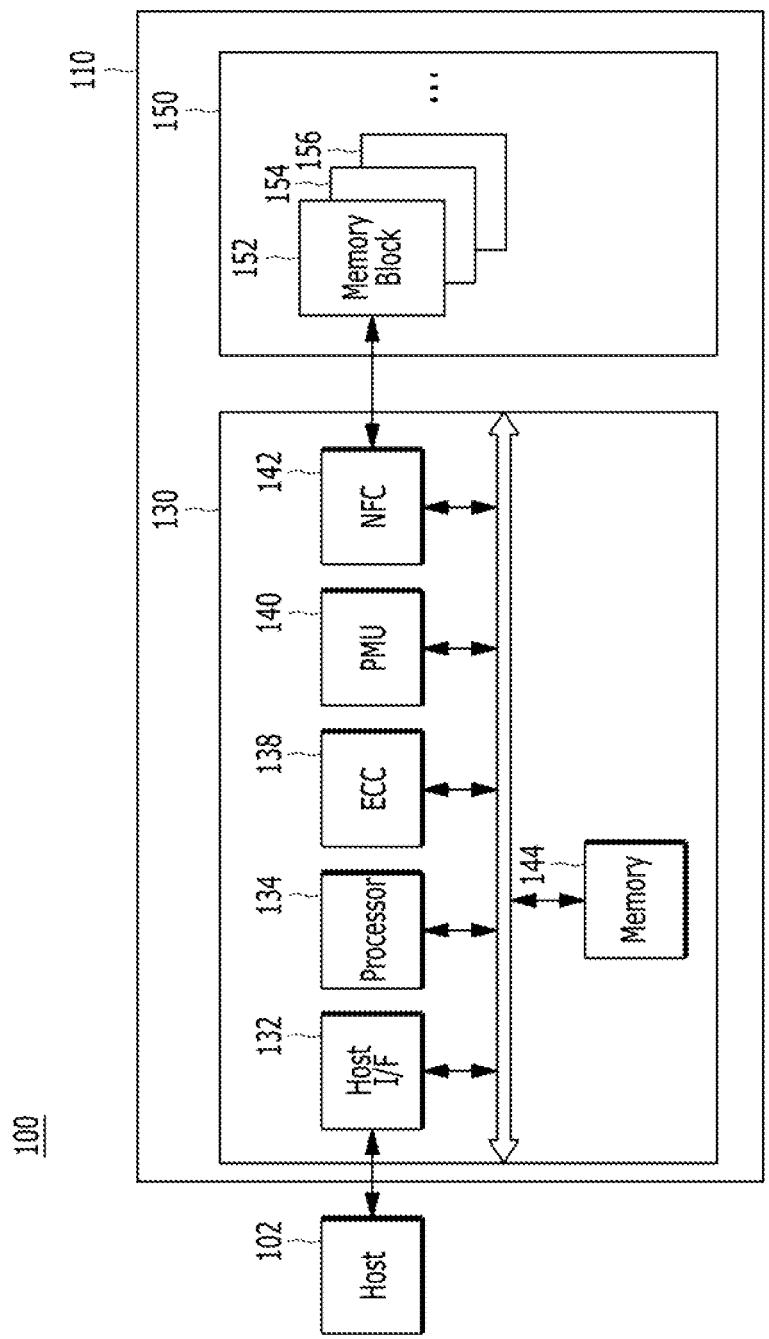
FIG. 1 is a diagram illustrating a data processing system including a memory system, according to an embodiment of the present invention.

Although, various embodiments are described below in more detail with reference to the accompanying drawings, we note that the present invention may, however, be embodied in different forms and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" Includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

FIG. 1 illustrates a data processing system 100 including a memory system, according to an embodiment of the present invention.

Referring to FIG. 1, the data processing system 100 may include a host 102 and a memory system 110.

The host 102 may include, for example, a portable electronic device such as a mobile phone, an MP3 player and a laptop computer or an electronic device such as a desktop computer, a game player, a television (TV) and a projector.

The memory system 110 may operate in response to a request from the host 102. For example, the memory system 110 may store data to be accessed by the host 102. The memory system 110 may be used as a main memory or an auxiliary memory of the host 102. The memory system 110 may be implemented with any one of various storage devices, according to the protocol of a host interface to be coupled electrically with the host 102. The memory system 110 may be implemented with any one of various storage devices, such as, for example, a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices forming the memory system 110 may be implemented with a volatile memory device, such as, a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (RRAM) and a flash memory.

The memory system 110 may include a memory device 150 and a controller 130. The memory device 150 stores data to be accessed by the host 102, and the controller 130 controls data exchange between the memory device 150 and the host 102. That is, under the control of the controller 130, data received from the host may be stored in the memory device 150.

The controller 130 and the memory device 150 may be integrated into one semiconductor device. For instance, the controller 130 and the memory device 150 may be integrated into one semiconductor device to form a solid state drive (SSD). When the memory system 110 is used as the SSD, the operation speed of the host 102 that is electrically coupled with the memory system 110 may be significantly increased.

The controller 130 and the memory device 150 may be integrated into one semiconductor device to form a memory card, such as, for example, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

For another instance, the memory system 110 may configure a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage for a data center, a device capable of transmitting and receiving information under a wireless environment, one of various electronic devices for a home network, one of various electronic devices for a computer network, one of various electronic devices for a telematics network, an RFID device, or one of various component elements for a computing system.

The memory device 150 may retain stored data even when power is blocked, store the data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of a word line (WL) are electrically coupled. The memory cells may be single bit cells or multi-bit cells. The memory cells may be arranged in a two or three dimensional stacked structure. The memory device 150 may be a nonvolatile memory device, for example, a flash memory. The flash memory may have a three-dimensional (3D) stack structure. The structure of the memory device 150 and the three-dimensional (3D) stack structure of the memory device 150 will be described later in detail with reference to FIGS. 2 to 11.

The controller 130 of the memory system 110 may control the memory device 150 in response to a request from the host 102. The controller 130 may provide the data read from the memory device 150, to the host 102, and store the data provided from the host 102 into the memory device 150. To this end, the controller 130 may control overall operations of the memory device 150, such as read, write, program, and erase operations.

For example, the controller 130 may include a host interface (I/F) unit 132, a processor 134, an error correction code (ECC) unit 138, a power management unit (PMU) 140, a NAND flash controller (NFC) 142, and a memory 144.

The host interface unit 132 may process commands and data provided from the host 102, and may communicate with the host 102 through at least one of various interface protocols such as universal serial bus (USB), multimedia card (MMC), peripheral component interconnect-express (PCI-E), serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150 and process data under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with volatile memory such as a static random access memory (SRAM) or a dynamic random access memory (DRAM). As described above, the memory 144 may store data used by the host 102 and the memory device 150 for the read and write operations. For such storage of the data, the memory 144 may include a program memory, a data memory, a write buffer, a read buffer, a map buffer, and so forth.

The processor 134 may control general operations of the memory system 110, and a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory system 100, and thus reliable bad block management is required.

Figure 2:
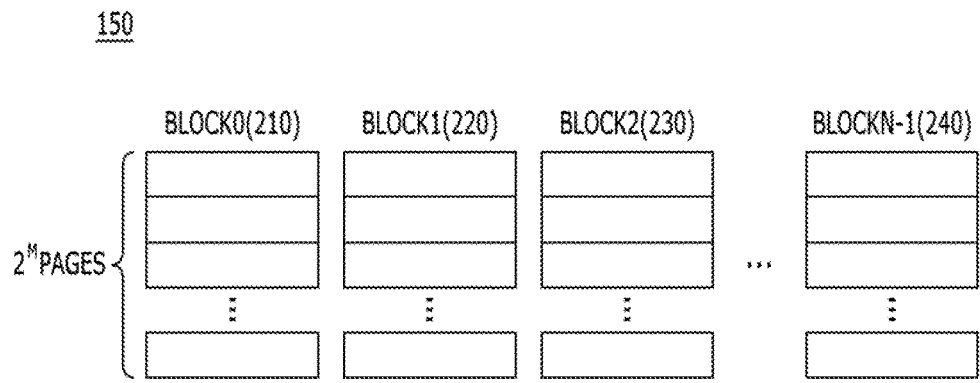
FIG. 2 is a diagram illustrating an example of a memory device employed in the memory system of FIG. 1.

FIG. 2 is a detailed diagram of the memory device 150 shown in FIG. 1.

Referring to FIG. 2, the memory device 150 may include a plurality of memory blocks, for example, a zeroth memory block (BLOCK0) 210, a first memory block (BLOCK1) 220, a second memory block (BLOCK2) 230 and an N-1$^{th}$ memory block (BLOCKN-1) 240. Each of the memory blocks 210 to 240 may include a plurality of pages, for example, $2^M$ number of pages ($2^M$ PAGES). Each of the pages may include a plurality of memory cells to which a plurality of word lines are electrically coupled.

Also, the memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may be defined as a triple level cell (TLC) memory block.

Each of the memory blocks 210 to 240 may store the data provided from the host 102 during a write operation, and provide the stored data to the host 102 during a read operation.

Figure 3:
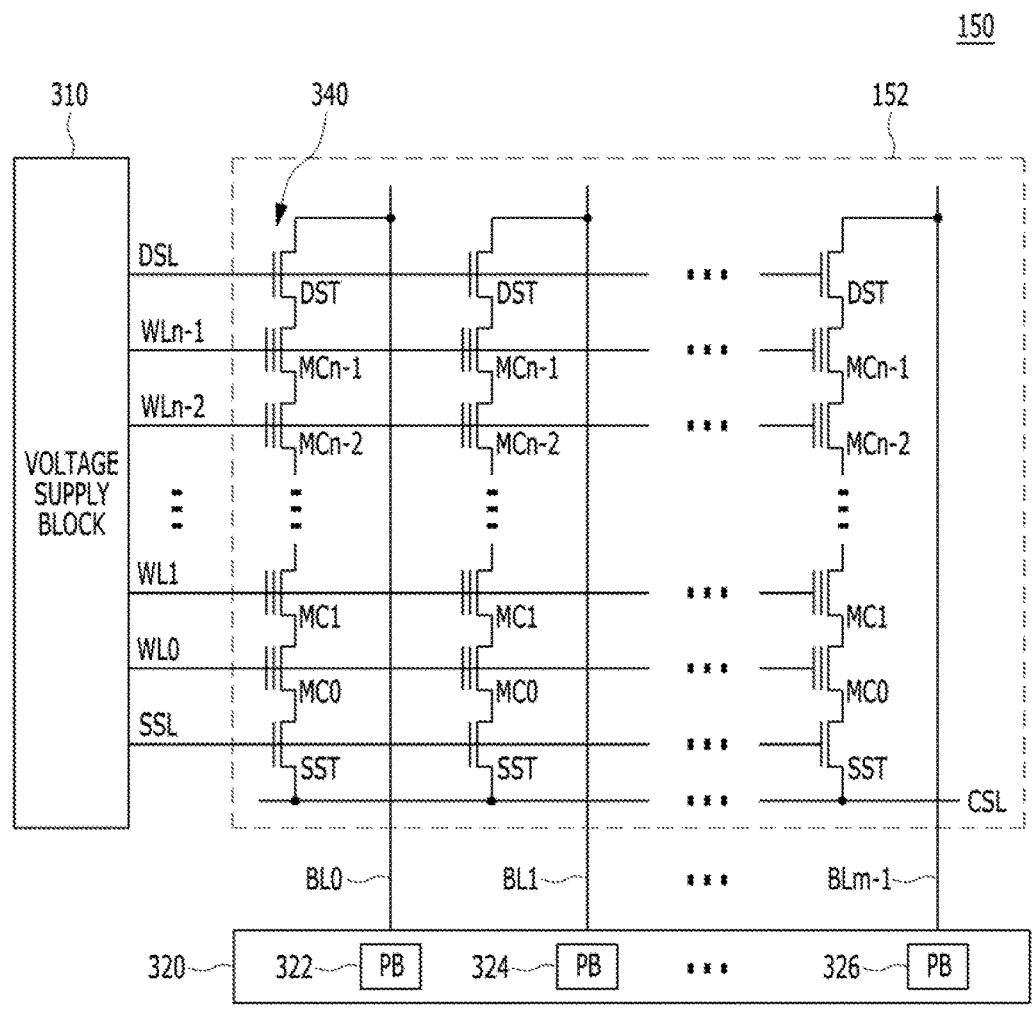
FIG. 3 is a circuit diagram illustrating a memory block in a memory device, according to an embodiment of the present invention.

FIG. 3 is a diagram illustrating a memory device 150 including the memory block shown in FIG. 2. FIG. 3 shows a detailed configuration of a single memory block 330 and circuits related thereto 310 and 320.

Referring to FIG. 3, the memory block 330 may include a plurality of cell strings 340 which are electrically coupled to bit lines BL0 to BLm-1, respectively. The cell string 340 of each column may include at least one drain select transistor (i.e., string select transistor) DST and at least one ground select transistor (i.e., source select transistor) GST. A plurality of memory cell transistors MC0 to MCn-1 may be electrically coupled in series between the select transistors GST and DST. The respective memory cells MC0 to MCn-1 may be configured by multi-level cells (MLC) each of which stores data state information of a plurality of bits. The cell strings 340 may be electrically coupled to the corresponding bit lines BL0 to BLm-1, respectively. For reference, in FIG. 3, 'DSL' denotes a drain select line (i.e., a string select line), 'GSL' denotes a ground select line (i.e., a source select line), and 'CSL' denotes a common source line.

While FIG. 3 shows, as an example, the memory block 330 which is configured by NAND flash memory cells, it is to be noted that the memory block 330 of the memory device 300 according to an exemplary embodiment of the present invention is not limited to NAND flash memory and may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supply block 310 of the memory device 300 may provide word line voltages, for example, a program voltage, a read voltage and a pass voltage, to be supplied to respective word lines according to an operation mode and voltages to be supplied to bulks, for example, well regions, where the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 300 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers 322, 324 and 326 respectively corresponding to columns (or bit lines) or pairs of columns (or pairs of bit lines), and a plurality of latches (not shown) may be included in each of the page buffers 322, 324 and 326.

The memory device 150 may be realized as a 2-dimensional or 3-dimensional memory device. For example, as shown in FIG. 4, in the case where the memory device 150 is realized as a 3-dimensional nonvolatile memory device, the memory device 150 may include a plurality of memory blocks BLK0 to BLKN-1.

Figure 4:
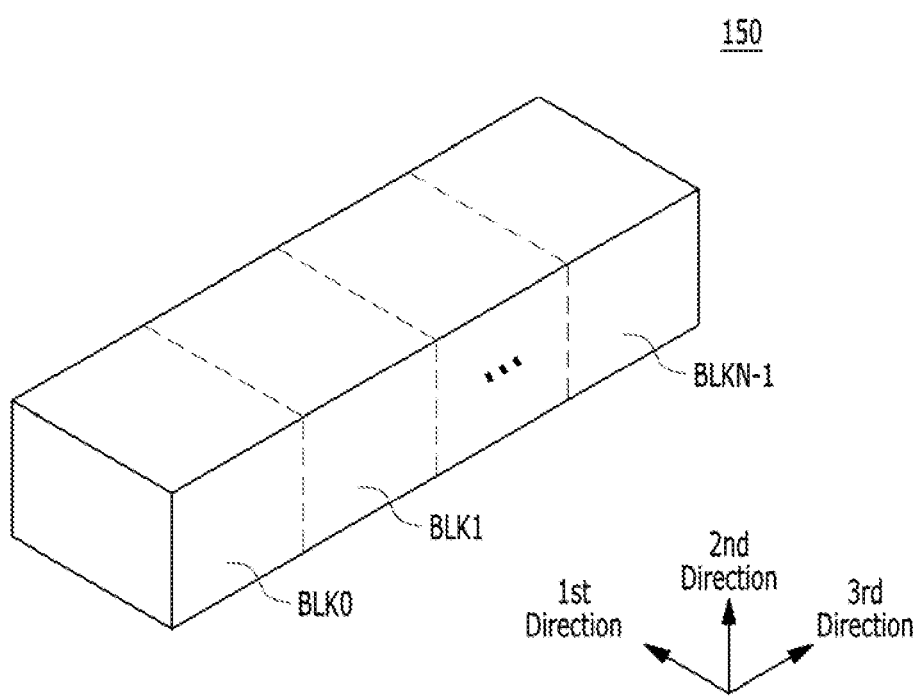
FIG. 4 is a diagram schematically illustrating an example configuration of a memory device, according to an embodiment of the present invention.

FIG. 4 is a block diagram illustrating the memory blocks of the memory device shown in FIG. 3, and the memory blocks BLK0 to BLKN-1 may be realized as a 3-dimensional structure (or a vertical structure). For example, the respective memory blocks BLK0 to BLKN-1 may be realized as a 3-dimensional structure by including a structure which extends in first to third directions (for example, the x-axis direction, the y-axis direction and the z-axis direction).

The respective memory blocks BLK0 to BLKN-1 may include a plurality of NAND strings extending in the second direction. The plurality of NAND strings may be provided in the first direction and the third direction. Each NAND string may be electrically coupled to a bit line, at least one drain select line, at least one ground select line, a plurality of word lines, at least one dummy word line, and a common source line. Namely, the respective memory blocks BLK0 to BLKN-1 may be electrically coupled to a plurality of bit lines, a plurality of drain select lines, a plurality of ground select lines, a plurality of word lines, a plurality of dummy word lines, and a plurality of common source lines.

Hereinbelow, detailed descriptions will be made with reference to FIGS. 5 to 7, of a data processing operation in a memory system, in accordance with an embodiment of the present invention. Particularly, a command data processing operation corresponding to a command received from a host 102 with respect to the memory device 150 will be described.

Figure 5:
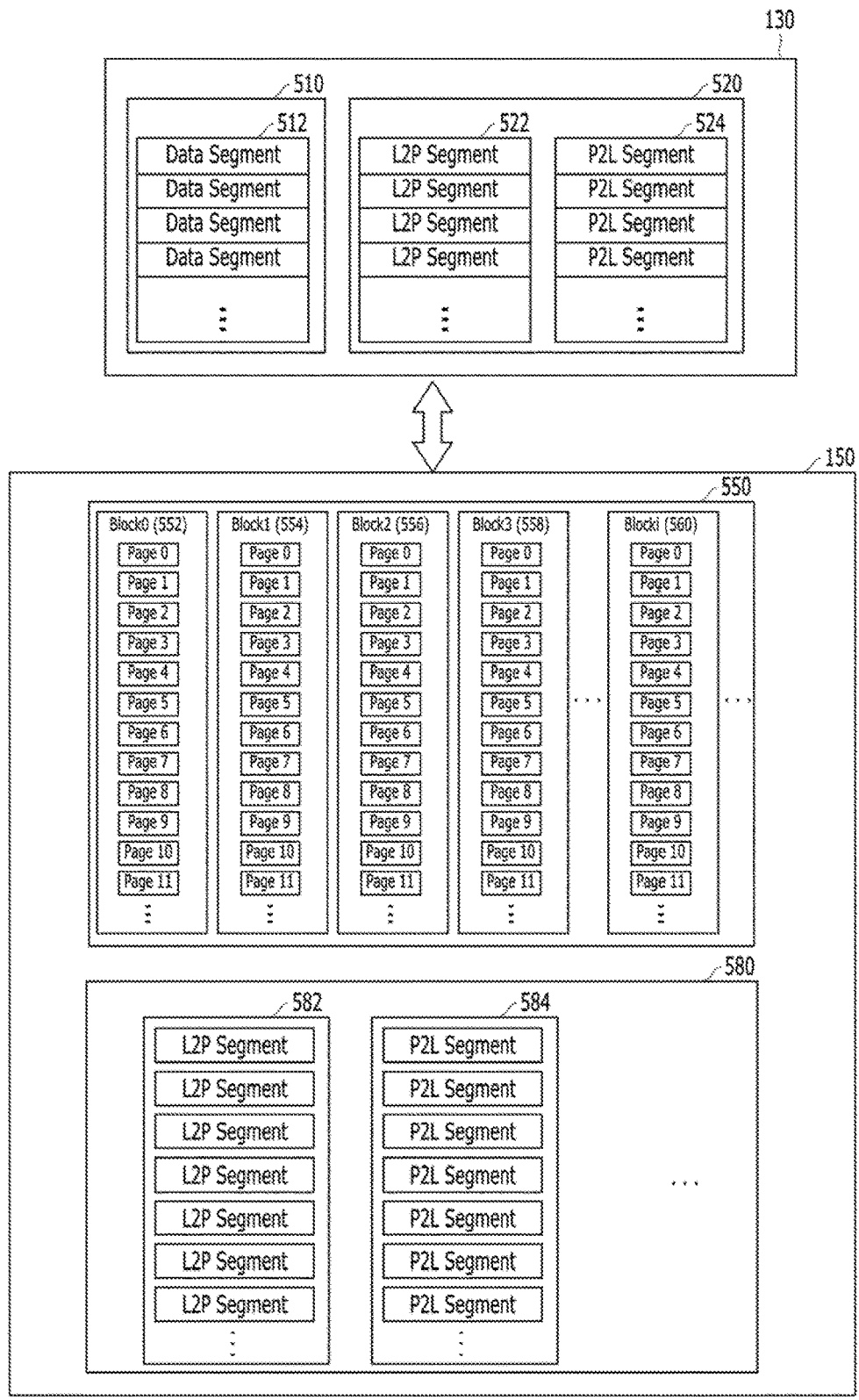
FIGS. 5 to 6 are diagrams schematically illustrating a data processing operation of a memory system, in accordance with an embodiment of the present invention.
Figure 6:
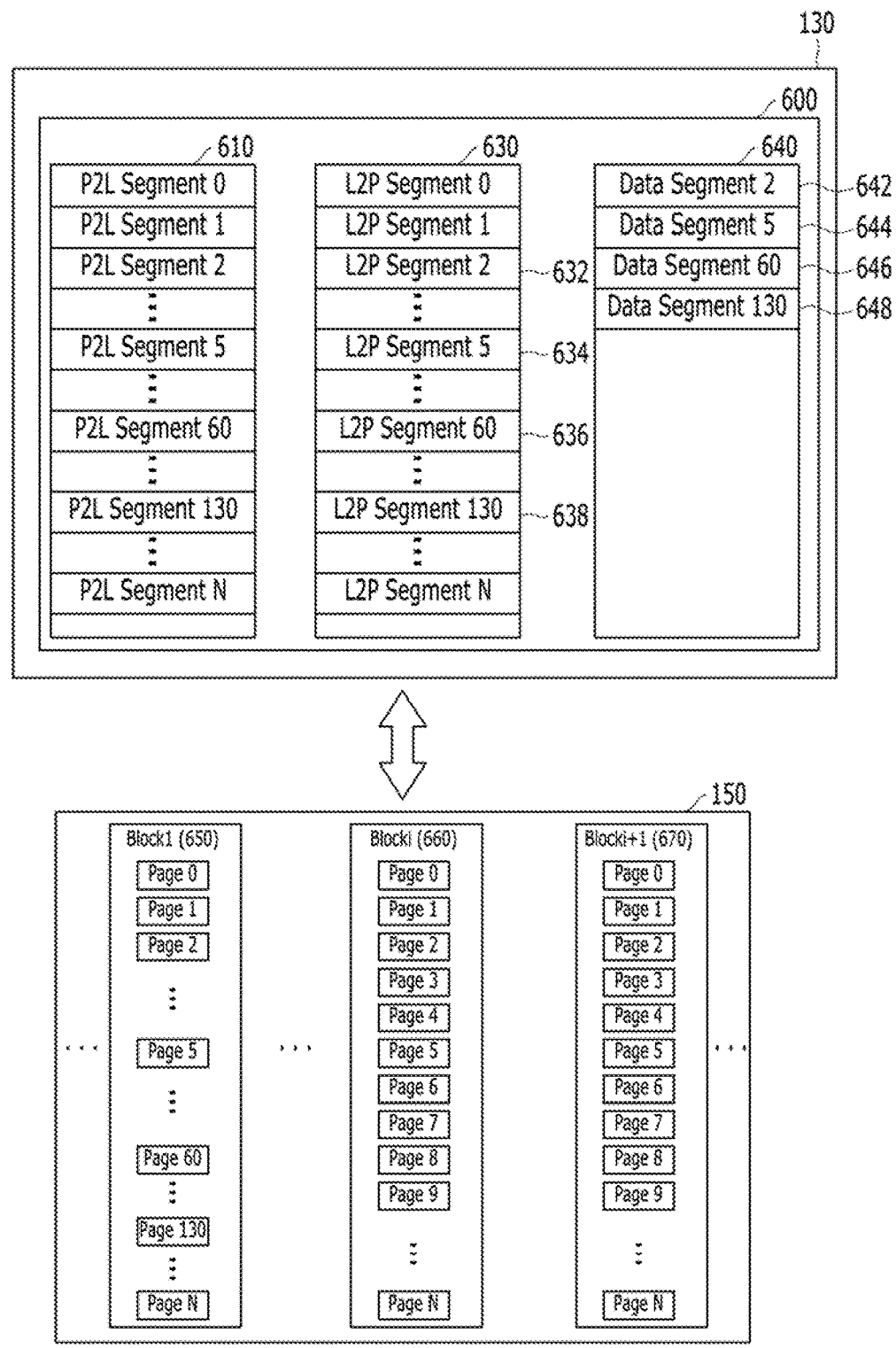

FIGS. 5 and 6 illustrate a data processing operation with respect to a memory device in a memory system, in accordance with an embodiment of the present invention. Hereinbelow, for the sake of convenience in explanation, descriptions will be made for data processing in the case where, in the memory system 110 shown in FIG. 1, after storing command data corresponding to a command received from the host 102 in the buffer/cache included in the memory 144 of the controller 130, a command operation corresponding to the command received from the host 102 is performed. For example, the write data corresponding to a write command stored in the buffer/cache are written (or programmed) in the plurality of memory blocks included in the memory device 150 and then the data programmed in the memory device 150 are updated and reprogrammed in the memory device 150.

Further, while, in the present embodiment, it will be described below as an example for the sake of convenience in explanation that the controller 130 performs a data processing operation in the memory system 110, it is to be noted that, as described above, the processor 134 included in the controller 130 may perform data processing through a flash translation layer (FTL). Moreover, in the present embodiment, after storing user data and metadata corresponding to the write command received from the host 102, in the buffer included in the memory 144 of the controller 130, the controller 130 writes and stores the data stored in the buffer, in the plurality of memory blocks included in the memory device 150. That is, the controller 130 performs a program operation.

The metadata may include first map data including logical/physical (logical to physical) (L2P) information (hereinafter, referred to as 'logical information') and second map data including physical/logical (physical to logical) (P2L) information (hereinafter, referred to as 'physical information'), for the data stored in the memory blocks in response to the program operation. Also, the metadata may include information on the command data corresponding to the command received from the host 102, information on the command operation corresponding to the command, information on the memory blocks of the memory device 150 for which the command operation is to be performed, and information on map data corresponding to the command operation. In other words, the metadata may include all remaining information and data excluding the user data corresponding to the command received from the host 102.

In the embodiment, in the case where the controller 130 receives a command (for example, a write command) from the host 102, the controller 130 writes and stores user data corresponding to the command, in memory blocks of the memory device 150. For example, among the memory blocks, the user data corresponding to the write command are written and stored in open memory blocks or free memory blocks. Open memory blocks are memory blocks having at least one page not programmed with data. Free memory blocks are blocks which have all their pages free of any data. A free memory block may be created from a closed memory block or an open memory block by performing an erase operation. Further, the controller 130 writes and stores metadata in open memory blocks or free memory blocks among the memory blocks of the memory device 150. The metadata includes mapping information between a logical address and a physical address for user data stored in the memory blocks, and mapping information between the physical address and the logical address for the memory blocks in which the user data is stored. The former mapping information is first map data including the L2P map table in which logical information is recorded. The latter mapping information is second map data including the P2L map table in which physical information is recorded. Particularly, in the embodiment, when a write command is received from the host 102, user data corresponding to the write command is written and stored in the memory blocks, and metadata including first map data and second map data for the user data stored in the memory blocks is stored in the memory blocks. In this case, data segments of the user data and meta segments of the metadata are stored in the memory blocks of the memory device 150. In other words, L2P segments of the first map data and P2L segments of the second map data as map segments of the map data are stored in the memory blocks of the memory device 150.

Also, in the present embodiment, in the case where the command operation in the memory blocks is performed for the user data corresponding to the command received from the host 102, in order to perform the command operation, the first map data and the second map data for the user data stored in the memory blocks are searched and checked. In other words, by searching for and checking the respective logical segments of the first map data for the user data and the respective physical segments of the second map data for the user data, the command operation for the user data in the memory blocks is performed. That is, by scanning the L2P segments of the first map data for the user data and the P2L segments of the second map data for the user data, the command operation for the user data in the memory blocks is performed. In this regard, in the embodiment, a background operation for the memory device 150 may be performed in consideration of first map data and second map data. For example, as a background operation, a processing operation of copying data stored in memory blocks of the memory device 150 to an arbitrary memory block may be performed. That is, a garbage collection (GC) operation may be performed. As another example of the background operation, a processing operation of swapping memory blocks of the memory device 150 or data stored in the memory blocks may be performed. That is, a wear leveling (WL) operation may be performed. As still another example of the background operation, an operation may be performed for storing map data which are stored in the controller 130, in memory blocks of the memory device 150. That is, a map flush operation may be performed.

Further, in an embodiment, the controller 130 stores write data corresponding to a write command received from the host 102 in the buffer included in the memory 144 of the controller 130. Then, the controller 130 programs the write data which are stored in the buffer to one or more pages of an arbitrary memory block of the plurality of memory blocks included in the memory device 150. For example, the controller 130 may perform a first program operation, in response to a first write command, for storing write data corresponding to the first write command received from the host in a first page of a first memory block. The first program operation may include first storing temporarily the write data in the buffer included in the memory 144 of the controller 130 and then storing the write data which are stored in the buffer into the first page of the first memory block. In the case where the controller 130 receives a second write command from the host 102 for the data which are stored in the first page of the first memory block, the controller 130 performs a second program operation for the data stored in the first page of the first memory block. In other words, the controller 130 may store write data corresponding to the second write command received from the host 102 in another empty page of the first memory block, or in an empty page of another arbitrary memory block. For example, the controller 130 may store the write data corresponding to the second write command received from the host 102 in a second page of the first memory block, or in a first page of a second memory block. At this time, the data stored in the first page of the first memory block, becomes invalid data and, accordingly, the first page of the first memory block becomes an invalid page.

In the embodiment, as described above, in the case where invalid pages are included in the memory blocks of the memory device 150, in order to maximize efficiency in use of the memory device 150, a data processing operation for processing data between the memory blocks of the memory device 150 may be performed. The data processing operation for processing data between the memory blocks of the memory device 150 may, for example, include a background operation. The background operation may be a garbage collection operation. A garbage collection operation may first include determining at least one memory block among the memory blocks of the memory device 150 which includes invalid pages and which is also a closed memory block, i.e., a memory block having all of its pages programmed with data. Then the controller 130 may copy and store any valid page data of the at least one closed memory block (which contains invalid data) to and in an open memory block, or a free memory block.

In performing the garbage collection operation, the controller 130 may check one or more parameters of the closed memory blocks and perform the garbage collection operation based on the one or more parameters. For example, the controller may determine the number of valid pages in each of the closed memory blocks of the memory device 150, and then perform a garbage collection operation according to the valid page counts (hereinafter, referred to as 'VPCs') of the closed memory blocks. Hence, in an embodiment, the parameter of the closed memory blocks determined by the controller may be a valid page count. Particularly, in an embodiment, a garbage collection operation may include selecting at least one source memory block among a plurality of closed memory blocks included in the memory device 150 and copying and storing any valid data of the at least one source memory block, to and in a target memory block. The at least one source memory block may be selected among a plurality of closed memory blocks based on the VPCs of the plurality the closed memory blocks. For example, the at least one source memory block may have the lowest VPC among the closed memory blocks of the memory device 150. In an embodiment, more than one source memory blocks may be selected. For example, it may select those closed memory blocks having a VPC less than a threshold VPC value as source memory blocks. When more than one closed memory blocks are selected as source memory blocks, the controller may perform the copying and storing steps for the valid data of each source memory block simultaneously or sequentially. For example, when a plurality of source memory blocks are selected as source memory blocks, the controller may perform the copying and storing steps for the valid data of each source memory block in a sequential manner starting with the source memory block having the lowest VPC, followed by the remaining selected source memory blocks in an increasing VPC order.

The target memory block may include an empty memory block, an open memory block or a free memory block, of which all pages have not been programmed. Further, the garbage collection operation may include performing an erase operation for the source memory blocks so that the source memory blocks are converted into empty or free memory blocks. Hereinafter, a data processing operation in the memory system in accordance with an embodiment will be described in more detail with reference to FIGS. 5 and 6.

Referring to FIG. 5, the controller 130 writes and stores data corresponding to a command received from the host 102 in open memory blocks 552, 554, 556 558 and 560 of a data memory group 550 among memory blocks of the memory device 150. For example, the controller 130 writes and stores user data corresponding to a write command, in open memory blocks 552, 554, 556 558 and 560 of the data memory group 550 among memory blocks of the memory device 150. Further, in response to a write operation for the data memory group 550, the controller 130 stores map data for user data in open memory blocks 582 and 584 of a map memory group 580 among the memory blocks of the memory device 150.

In this regard, the controller 130 stores information indicating that the user data is stored in pages included in the open memory blocks 552, 554, 556, 558 and 560 of the data memory group 550 of the memory device 150. For example, the controller 130 stores first map data and second map data in the open memory blocks 582 and 584, respectively. In other words, the controller 130 stores logical segments (that is, L2P segments) of the first map data in the first memory block 582 of the map memory group 580, and stores physical segments (that is, P2L segments) of the second map data, in the second memory block 584 of the map memory group 580.

Furthermore, the controller 130 caches and buffers data corresponding to a command received from the host 102 in a first buffer 510 included in the memory 144 of the controller 130. For example, the controller 130 caches and buffers user data corresponding to a write command, in the first buffer 510 included in the memory 144 of the controller 130. That is, the controller 130 stores data segments 512 of the user data in the first buffer 510 functioning as a data buffer/cache, and then writes and stores the data segments 512 stored in the first buffer 510, in pages of the open memory blocks 552, 554, 556, 558 and 560 included in the data memory group 550 of the memory device 150.

As the data segments 512 of the user data corresponding to the command received from the host 102 are written and stored in the pages of the open memory blocks 552, 554, 556, 558 and 560 included in the data memory group 550 of the memory device 150, the controller 130 generates first map data and second map data and stores them in the second buffer 520 included in the memory 144 of the controller 130. That is, the controller 130 stores L2P segments 522 of the first map data and P2L segments 524 of the second map data for the user data, in the second buffer 520 functioning as a map buffer/cache. In this regard, as described above, the L2P segments 522 of the first map data and the P2L segments 524 of the second map data may be stored in the second buffer 520 of the memory 144 of the controller 130. As illustrated, in FIG. 5, a map list for the L2P segments 522 of the first map data and a map list for the P2L segments 524 of the second map data may be stored in the second buffer 520.

In addition, the controller 130 stores the L2P segments 522 of the first map data and the P2L segments 524 of the second map data that have been stored in the second buffer 520, in the first memory block 582 and the second memory block 584 of the map memory group 580 of the memory device 150. In the embodiment of FIG. 5, the data segments 512, the L2P segments 522 of the first map data and the P2L segments 524 of the second map data are stored in different memory blocks among the memory blocks of the memory device 150 data memory group 550 map memory group 580 However, we note that, in another embodiment, the data segments 512, the L2P segments 522 of the first map data and the P2L segments 524 of the second map data may be stored in the same arbitrary memory block, without distinction between the data memory group 550 and the map memory group 580. In other words, although in the illustrated embodiment of FIG. 5, the data segments 512, the L2P segments 522 of the first map data and the P2L segments 524 of the second map data are separately stored in the data memory group 550 and the map memory group 580 the present invention is not limited in this way. For example, in another embodiment (not shown), the data segments 512, the L2P segments 522 of the first map data and the P2L segments 524 of the second map data may be stored in the same arbitrary memory block, i.e., without separating the user data and map data in different memory blocks and different data and map memory groups 550 and 580.

In an embodiment, when a command operation corresponding to a command received from the host 102 is performed, the controller may perform an operation of scanning the first map data and the second map data for the user data corresponding to the received command. Specifically, the controller 130 may scan the L2P segments 522 of the first map data and the P2L segments 524 of the second map data that have been stored in the second buffer 520.

Alternatively, the controller 130 may load the L2P segments of the first map data and the P2L segments of the second map data that have been stored in the first and second memory blocks 582 and 584, respectively, of the map memory group 580 of the memory device 150, to the second buffer 520, and then scan the L2P segments 522 of the first map data and the P2L segments 524 of the second map data that have been loaded to the second buffer 520.

In this regard, in the embodiment, as described above, the controller may first determine one more source memory blocks by selecting one or more closed memory blocks among the memory blocks included in the memory device 150, which contain invalid pages based on one or more parameters (e.g., VPCS) Then, the controller 130 may copy and store the valid data of the one or more source memory blocks to and in one or more target memory blocks. Particularly, the controller 130 may check valid pages included in the closed memory blocks through the scanning of the L2P segments 522 of the first map data and the P2L segments 524 of the second map data, and then copy and store data stored in the valid pages (that is, valid data) to and in the target memory block. For example, target memory block may an empty memory block, i.e., a memory block having one or more empty pages. In an embodiment, the target memory block may an open memory block. In another embodiment the target memory block may be a free memory block. In yet another embodiment, the target memory block may be either an open memory block, a free memory block or a combination thereof.

The controller 130 may first select a source memory block taking into account parameters (e.g., VPCs) of the closed memory blocks included in the memory device 150, may then check map segments of map data for the source memory block and based on the map segments of the map data determine valid pages corresponding to the VPCs among a plurality of pages included in the source memory block. For example, the map segments of map data for the source memory block may include L2P segments of first map data and P2L segments of second map data. The controller 130 may perform a garbage collection operation of storing data stored in the valid pages of the source memory block (that is, valid data) in a target memory block of the memory device 150, and then may perform an erase operation for the source memory block, thus rendering the source memory block into an empty memory block. For example, in an embodiment the erasing step is applied to all the pages of a source memory block thus rendering the source memory block into a free memory block. In another embodiment, the erasing step is applied to only the invalid pages of the source memory block thus rendering the source memory block into an open memory block having only valid pages and empty pages.

Hereinafter, the garbage collection operation for memory blocks of the memory device 150 in the memory system, in accordance with an embodiment, will be described in more detail with reference to FIG. 6. In the following embodiment, as illustrated in FIG. 2, each of the memory blocks included in the memory device 150 includes an N+1 number of pages as a $2^M$ number of pages, and a garbage collection operation is performed on the assumption that, among closed memory blocks in each of which a data program has been performed for an N+1 number of pages thereof, an arbitrary memory block (for example, a memory block 1) is selected as a source memory block taking into account parameters (e.g., VPCs) of the closed memory blocks, and, among open memory blocks in each of which a data program has not been performed for an N+1 number of pages thereof, an arbitrary memory block (e.g., memory block i or memory block i+1) is selected as a target memory block.

Referring to FIG. 6, the controller 130 determines which memory blocks, among the plurality of memory blocks included in the memory device 150, are closed memory blocks, i.e., memory blocks for which a data program has been performed for all their pages included therein, (e.g., for an N+1 number of pages), and selects a source memory block among the closed memory blocks based on a parameter of the closed memory blocks. The parameter may, for example, be the VPCs of the closed memory blocks. For example, the controller may select as a source memory block the closed memory block with the lowest VPC. As illustrated, in the embodiment of FIG. 6, the controller 130 may select memory block 1 650 among the memory blocks of the memory device 150 as the source memory block. In this regard, in the illustrated the source memory block 1, 650 may be selected taking into account the VPCs of the closed memory blocks. However, we note that the invention is not limited in using the VPCs of the closed memory blocks as a parameter for determining the source memory block. For example, the source memory block may be selected among the closed memory blocks of the memory device 150 taking into account other parameters of the closed memory blocks. For example, other suitable parameters of the closed memory blocks may include read parameters, write/program parameters, update parameters, erase parameters, and so forth.

Furthermore, the controller 130 may check, among the plurality of memory blocks included in the memory device 150, open memory blocks in each of which a data program has not been performed for all of their pages (e.g., an N+1 number of pages) included therein, and may select a target memory block among the open memory blocks. For example, the controller 130 may select a memory block i 660 or memory block i+1 670 among the memory blocks of the memory device 150 as the target memory block. More specifically, among a plurality of open memory blocks the controller will select a target memory block based on one or more parameters of the open memory blocks. For example, the one or more parameters may include a parameter indicating the number of their invalid pages (IPNs), their VPCs, and or their number of empty pages (EPNs). For example, a target memory block may have an IPN value of 0 Indicating that it contains no invalid pages, and may also have the greatest IPN value indicating among the open blocks having a 0 value IPN.

After having selected the memory block 1 650 among the memory blocks of the memory device 150 as the source memory block, the controller 130 may check the valid pages among a plurality of pages included in the source memory block. In other words, the controller 130 determines which pages are valid pages among a plurality of pages (e.g., an N+1 number of pages) included in the memory block 1 650. In this regard, in the case where, as shown in FIG. 5, the controller 130 writes and stores data segments of user data corresponding to a write command received from the host, in the N+1 number of pages included in the memory block 1 650, the controller 130 stores, in response to the write operation to the memory block 1 650, L2P segments of first map data and P2L segments of second map data for the memory block 1 650, in arbitrary memory blocks of the memory device 150. For example, the controller 130 stores the L2P segments of the first map data and the P2L segments of the second map data for the memory block 1 650 in the first memory block 582 and the second memory block 584 of the map memory group 580. Then, the controller 130 performs scanning between the P2L segments of the second map data and the L2P segments of the first map data for the memory block 1 650 so as to determine the valid pages of the memory block 1 650.

In more detail, for determining the valid pages among the N+1 number of pages included in the memory block 1 650, the controller 130 loads map segments of the second map data for the memory block 1 650, on a buffer 600 included in the memory 144, and loads map segments of first map data for the P2L segments 610, on the buffer 600 included in the memory 144. That is, the controller 130 loads the P2L segments 610 and the L2P segments 630 on the buffer 600. The controller 130 thereafter checks the P2L segments 610 and the L2P segments 630 loaded on the buffer 600 for determining the valid pages among the N+1 number of pages of the memory block 1 650.

For example, the controller 130 loads the P2L segments 610 for the memory block 1 650 selected as the source memory block, on the buffer 600, and loads the L2P segments 630 for the P2L segments 610 on the buffer 600. In other words, the controller 130 loads L2P segment 0 for P2L segment 0 on the buffer 600. The controller 130 checks the L2P segment 0 for the P2L segment 0, and checks whether page 0 of the memory block 1 650 is a valid page. That is, the controller 130 checks whether a data segment stored in the page 0 of the memory block 1 650 is a data segment of valid data. If the page 0 of the memory block 1 650 is a valid page, the controller 130 loads data segment 0 (that is, valid data) stored in the page 0 of the memory block 1 650 on the buffer 600. If the page 1 of the memory block 1 650 is not a valid page, the controller 130 loads L2P segment 1 for P2L segment 1 on the buffer 600, and checks the P2L segment 1 and the L2P segment 1, thus checking whether page 1 of the memory block 1 650 is a valid page. That is, the controller 130 checks whether a data segment stored in the page 1 of the memory block 1 650 is a data segment of valid data.

The controller 130 checks the P2L segment 0 and the L2P segment 0 and discards, if the page 0 of the memory block 1 650 is not a valid page, the L2P segment 0 loaded on the buffer 600. Furthermore, the controller 130 checks the P2L segment 0 and the L2P segment 0, and loads, if the page 0 of the memory block 1 650 is a valid page, the data segment 0 stored in the page 0 of the memory block 1 650, on the buffer 600, and copies and stores the data segment 0 loaded on the buffer 600 to and in a target memory block. For example, the target memory block may be memory block i 660 or memory block i+1 670.

As such, the controller 130 checks the P2L segments 610 and the L2P segments 630 for the memory block 1 650 that have been loaded on the buffer 600, and thus checks valid pages among the N+1 number of pages included in the memory block 1 650. Also, the controller 130 loads data segments 640 stored in the valid pages of the memory block 1 650, on the buffer 600, and then copies and stores the data segments 640 loaded on the buffer 600, to and in the target memory block, for example, the memory block i 660 or the memory block i+1 670. Hereinafter, detailed descriptions will be made, as an example, for the case where among the N+1 number of pages of the memory block 1 650 selected as the source memory block, page 2, page 5, page 60 and page 130 are valid pages. Because the valid pages among the N+1 number of pages of the memory block 1 650 are the page 2, page 5, page 60 and page 130, the VPC of the memory block 1 650 is four. As described above, in response to VPC=4, the controller 130 selects the memory block 1 650 as a source memory block.

In more detail, for example, the controller 130 loads the P2L segments 610 for the memory block 1 650 on the buffer 600, loads L2P segment 2 632 for P2L segment 2 among the P2L segments 610 on the buffer 600, and then checks the P2L segment 2 and the L2P segment 2 632 loaded on the buffer 600, thus checking that the page 2 of the memory block 1 650 is a valid page. In other words, the controller 130 checks that data segment 2 642 stored in the page 2 of the memory block 1 650 is valid data. In this regard, as described above, the controller 130 loads, among the P2L segments 610 loaded on the buffer 600, the L2P segment 0 for the P2L segment 0 and the L2P segment 1 for the P2L segment 1, on the buffer 600, and checks the P2L segment 0, the L2P segment 0, the P2L segment 1 and the L2P segment 1, thus checking that the page 0 and the page 1 of the memory block 1 650 are not valid pages. In this case, the controller 130 discards the L2P segment 0 and L2P segment 1 loaded on the buffer 600.

The controller 130 loads the data segment 2 642 stored in the page 2 checked as the valid page in the memory block 1 650, on the buffer 600, and writes and stores the data segment 2 642 loaded on the buffer 600, in pages included in the target memory block such as the memory block i 660 or the memory block i+1 670. In the case of this embodiment, for example, the controller 130 writes and stores the data segment 2 642 in page 0 of the memory block i 660.

In this case, as described above, the controller 130 copies and stores the valid data stored in the source memory block among the memory blocks of the memory device 150, to and in the target memory block. That is, the controller 130 performs a garbage collection operation, and thereby predicts and checks that the valid data stored in the memory block 1 650 that is the source memory block is stored in the memory block i 660 that is the target memory block. Then, the controller 130 loads data segment 640 of the valid data stored in the memory block 1 650 that is the source memory block, on the buffer 600, and thereafter updates the map data loaded on the buffer 600, in response to the storage of the data segments 640 of the valid data loaded on the buffer 600, in the memory block i 660 that is the target memory block. For example, the controller 130 updates the L2P segments 630 of the first map data in the memory block i 660. Subsequently, the controller 130 stores the data segments 640 of the valid data loaded on the buffer 600 and the updated L2P segments 630 of the first map data in the memory block i 660 or the memory block i+1 670 that is the target memory block.

That is, the controller 130 loads the data segments 640 stored in the valid page of the memory block 1 650 that is the source memory block on the buffer 600. In other words, the controller 130 loads the data segments 640 of the valid data, on the buffer 600. Thereafter the controller 130 updates the map segments of the map data for the data segments 640 of the valid data loaded on the buffer 600. For example, the controller 130 updates the L2P segments 630 of the first map data. Subsequently, the controller 130 stores the data segments 640 of the valid data loaded on the buffer 600 and the updated L2P segments 630 of the first map data, in the memory block i 660 or the memory block i+1 670 that is the target memory block.

In this regard, as shown in FIG. 5, the data segments 640 of the valid data loaded on the buffer 600 and the updated L2P segments 630 of the first map data may be stored in different target memory blocks. In other words, the data segments 640 of the valid data may be stored in a target memory block included in the data memory group 550, and the updated L2P segments 630 of the first map data may be stored in a target memory block included in the map memory group 580. For example, the data segments 640 of the valid data may be stored in the memory block i 660 that is a target memory block included in the data memory group 550, and the updated L2P segments 630 of the first map data may be stored in the memory block i+1 670 that is a target memory block included in the map memory group 580. In addition, the updated L2P segments 630 of the first map data and the data segments 640 of the valid data may be stored in the same target memory block. Hereinbelow, detailed descriptions will be made, as an example, for the case where the metadata are stored in the same target memory block. For example, the updated L2P segments 630 of the first map data and the data segments 640 of the valid data may be stored in the memory block i 660.

That is, the controller 130 loads the data segment 2 642 stored in the page 2 checked as a valid page in the memory block 1 650, on the buffer 600, and writes and stores the data segment 2 642 of the valid data loaded on the buffer 600, in the page 0 of the memory block i 660 that is the target memory block. In this regard, the controller 130 updates the L2P segment 2 632 loaded on the buffer 600, in response to the storage of the data segment 2 642 of the valid data in the page 0 of the memory block i 660. Furthermore, the controller 130 stores the data segment 2 642 of the valid data loaded on the buffer 600 and the updated L2P segment 2 632, in pages included in the memory block i 660 that is the target memory block. In this case, the controller 130 stores the data segment 2 642 loaded on the buffer 600, in the page 0 of the memory block i 660, and stores the updated L2P segment 2 632 in the page 1 of the memory block i 660. Also, the controller 130 stores, in the page 2 of the memory block i 660, the P2L segment 0 corresponding to the storage of the data segment 2 642 in the page 0 of the memory block i 660 or the storage of the updated L2P segment 2 632 in the page 1 of the memory block i 660.

Accordingly, the controller 130 completes the operation of copying the data segment 2 642 of the page 2 checked as a valid page in the N+1 number of pages included in the memory block 1 650, to the target memory block, and the update and storage of the map data corresponding to the copy operation to the target memory block. That is, the controller 130 completes the garbage collection operation for the data segment 2 642 of the page 2 checked as a valid page in the N+1 number of pages included in the memory block 1 650. That is, the controller 130 completes checking whether one arbitrary page among the N+1 number of pages included in the memory block 1 650 is a valid page, and copying valid data for the arbitrary page checked as the valid page and updating and storing the map data for the arbitrary page. Thereafter, the controller 130 checks whether a next arbitrary page among the N+1 number of pages included in the memory block 1 650 is a valid page.

For example, as described above, after the controller 130 has checked the page 2 as a valid page in the N+1 number of pages included in the memory block 1 650 and completed the garbage collection operation, the controller 130 checks whether page 3 subsequent to the page 2 is a valid page. To check whether the page 3 of the memory block 1 650 is a valid page, the controller 130 loads L2P segment 3 for P2L segment 3 among the P2L segments 610 loaded on the buffer 600, on the buffer 600, and checks the P2L segment 3 and the L2P segment 3 loaded on the buffer 600, thus checking whether the page 3 of the memory block 1 650 is a valid page. In this case, the controller 130 checks that the page 3 of the memory block 1 650 is not a valid page, and discards the L2P segment 3 loaded on the buffer 600. Furthermore, the controller 130 checks whether page 4 subsequent to the page 3 is a valid page, and then checks that the page 4 is not a valid page, and discards L2P segment 4 loaded on the buffer 600.

In addition, the controller 130 loads, among the P2L segments 610 loaded on the buffer 600, L2P segment 5 634 for P2L segment 5, on the buffer 600, and then checks the P2L segment 5 and the L2P segment 5 634 loaded on the buffer 600, thus checking that the page 5 of the memory block 1 650 is a valid page. That is, the controller 130 checks that data segment 5 644 stored in the page 5 is a valid page. Furthermore, the controller 130 loads data segment 5 644 stored in the page 5 checked as a valid page in the memory block 1 650, on the buffer 600. The controller 130 updates the map segment of the map data for the data segment 5 644 loaded on the buffer 600. That is, the controller 130 updates the L2P segment 5 634 of the first map data. Furthermore, the controller 130 stores the data segment 5 644 loaded on the buffer 600 and the updated L2P segment 5 634 of the first map data, in pages included in the memory block i 660 that is the target memory block. In this case, the controller 130 stores the data segment 5 644 loaded on the buffer 600, in the page 3 of the memory block i 660, stores the updated L2P segment 5 634 in the page 4 of the memory block i 660, and stores, in the page 5 of the memory block i 660, the P2L segment 1 corresponding to the storage of the data segment 5 644 in the page 3 of the memory block i 660 or the storage of the updated L2P segment 5 634 in the page 4 of the memory block i 660.

Accordingly, the controller 130 completes the operation of copying the data segment 5 644 of the page 5 checked as a valid page in the N+1 number of pages included in the memory block 1 650, to the target memory block, and the update and storage of the map data corresponding to the copy operation to the target memory block. That is, the controller 130 completes the garbage collection operation for the data segment 5 644 of the page 5 checked as a valid page in the N+1 number of pages included in the memory block 1 650. Thereafter, the controller 130 checks whether page 6 among the N+1 number of pages included in the memory block 1 650 is a valid page.

For example, as described above, after the controller 130 has checked the page 5 as a valid page in the N+1 number of pages included in the memory block 1 650 and completed the garbage collection operation, the controller 130 checks whether the page 6 subsequent to the page 5 is a valid page. To check whether the page 6 of the memory block 1 650 is a valid page, the controller 130 loads L2P segment 6 for P2L segment 6 among the P2L segments 610 loaded on the buffer 600, on the buffer 600, and checks the P2L segment 6 and the L2P segment 6 loaded on the buffer 600, thus checking whether the page 6 of the memory block 1 650 is a valid page. In this case, the controller 130 checks that the page 6 of the memory block 1 650 is not a valid page, and discards the L2P segment 6 loaded on the buffer 600.

In addition, the controller 130 loads, among the P2L segments 610 loaded on the buffer 600, L2P segment 60 636 for P2L segment 60 on the buffer 600, and then checks the P2L segment 60 and the L2P segment 60 636 loaded on the buffer 600, thus checking that the page 60 of the memory block 1 650 is a valid page. That is, the controller 130 checks that data segment 60 646 stored in the page 60 is a valid page. Furthermore, the controller 130 loads data segment 60 646 stored in the page 60 checked as a valid page in the memory block 1 650, on the buffer 600. The controller 130 updates the map segment of the map data for the data segment 60 646 loaded on the buffer 600. That is, the controller 130 updates the L2P segment 60 636 of the first map data. Furthermore, the controller 130 stores the data segment 60 646 loaded on the buffer 600 and the updated L2P segment 60 636 of the first map data, in pages included in the memory block i 660 that is the target memory block. In this case, the controller 130 stores the data segment 60 646 loaded on the buffer 600, in the page 6 of the memory block i 660, stores the updated L2P segment 60 636 in page 7 of the memory block i 660, and stores, in page 8 of the memory block i 660, the P2L segment 2 corresponding to the storage of the data segment 60 646 in the page 6 of the memory block i 660 or the storage of the updated L2P segment 60 636 in the page 7 of the memory block i 660.

Accordingly, the controller 130 completes the operation of copying the data segment 60 646 of the page 60 checked as a valid page in the N+1 number of pages included in the memory block 1 650, to the target memory block, and the update and storage of the map data corresponding to the copy operation to the target memory block. That is, the controller 130 completes the garbage collection operation for the data segment 60 646 of the page 60 checked as a valid page in the N+1 number of pages included in the memory block 1 650.

In addition, the controller 130 loads, among the P2L segments 610 loaded on the buffer 600, L2P segment 130 638 for P2L segment 130 on the buffer 600, and then checks the P2L segment 130 and the L2P segment 130 638 loaded on the buffer 600, thus checking that the page 130 of the memory block 1 650 is a valid page. That is, the controller 130 checks that data segment 130 648 stored in the page 130 is a valid page. Furthermore, the controller 130 loads data segment 130 648 stored in the page 130 checked as a valid page in the memory block 1 650, on the buffer 600. The controller 130 updates the map segment of the map data for the data segment 130 648 loaded on the buffer 600. That is, the controller 130 updates the L2P segment 130 638 of the first map data. Furthermore, the controller 130 stores the data segment 130 648 loaded on the buffer 600 and the updated L2P segment 130 638 of the first map data, in pages included in the memory block i 660 that is the target memory block. In this case, the controller 130 stores the data segment 130 648 loaded on the buffer 600, in page 9 of the memory block i 660, stores the updated L2P segment 130 638 in page 10 of the memory block i 660, and stores, in page 11 of the memory block i 660, the P2L segment 3 corresponding to the storage of the data segment 130 648 in the page 9 of the memory block i 660 or the storage of the updated L2P segment 130 638 in the page 10 of the memory block i 660.

Accordingly, the controller 130 completes the operation of copying the data segment 130 648 of the page 130 checked as a valid page in the N+1 number of pages included in the memory block 1 650, to the target memory block, and the update and storage of the map data corresponding to the copy operation to the target memory block. That is, the controller 130 completes the garbage collection operation for the data segment 130 648 of the page 130 checked as a valid page in the N+1 number of pages included in the memory block 1 650.

As such, in the memory system in accordance with the embodiment, the controller 130 loads the P2L segments 610 of the memory block 1 650 that is the source memory block, on the buffer 600, and then loads, on the buffer 600, the L2P segments 630 for the respective P2L segments 610 loaded on the buffer 600. Thereafter, the controller 130 checks the P2L segments 610 and the L2P segments 630 loaded on the buffer 600, thus checking a valid page in the N+1 number of pages included in the memory block 1 650. Subsequently, the controller 130 loads the data segments 640 stored in the valid page. That is, the controller 130 loads the data segments 640 of the valid data, on the buffer 600, updates the map data for the data segments 640 of the valid data loaded on the 600. For example, the controller 130 updates the L2P segments 630 of the first map data, and then stores the data segments 640 of the valid data loaded on the buffer 600 and the updated L2P segments 630 of the first map data, in pages of the memory block i 660 that is the target memory block.

In this case, in the memory system in accordance with the embodiment, as described above, the controller 130 completes, for the N+1 number of pages of the memory block 1 650 that is the source memory block, a garbage collection operation on a valid page basis. In other words, the controller 130 performs, on a valid page basis among the N+1 number of pages of the memory block 1 650, the operations of loading the valid data on the buffer 600, updating the map data for the loaded valid data, and storing the loaded valid data and the updated map data in the target memory block. Accordingly, in the memory system in accordance with the embodiment, even if power off occurs while the garbage collection operation for the memory device 150 is performed, the garbage collection operation that has been performed before the power off occurs can be performed successively after power on.

For example, in the memory system in accordance with the embodiment, if power off occurs after the garbage collection operation for the data segment 5 644 stored in the page 5 of the memory block 1 650 that is the source memory block has been completed, the controller 130 checks, when the memory system is powered on, whether the page 6 subsequent to the page 5, among the N+1 number of pages included in the memory block 1 650, is a valid page. In other words, if the power off occurs after the data segment 5 644 and the L2P segment 5 634 and the P2L segment 5 for the data segment 5 644 have been stored in pages of the memory block i 660 that is the target memory block, as described above, the controller 130 checks, when the memory system is powered on, whether the page 6 subsequent to the page 5, among the N+1 number of pages included in the memory block 1 650, is a valid page. In other words, when the memory system is powered on, the controller 130 checks that the garbage collection operation for the data segment 5 644 has been completed, through the data segment 5 644 stored in the page 3 of the memory block i 660 that is the target memory block, the L2P segment 5 634 stored in the page 4 of the memory block i 660, and the P2L segment 1 stored in the page 5 of the memory block i 660. Accordingly, the controller 130 performs an operation of checking whether the page 6 of the memory block 1 650 is a valid page. In this case, the data segment 5 644 stored in the page 3 of the memory block i 660 that is the target memory block, the L2P segment 5 634 stored in the page 4 of the memory block i 660, and the P2L segment 1 stored in the page 5 of the memory block i 660 become checkpoints instructing start and completion of the garbage collection operation for the data segment 5 644.

In a memory system in accordance with another embodiment, the controller 130 completes, on a memory block basis, a garbage collection operation for the memory block 1 650 that is a source memory block. In the memory system in accordance with another embodiment, in the case where the garbage collection operation is completed on a memory block basis, to check a valid page in the memory block 1 650 that is the source memory block, the controller 130 loads all of the P2L segments 610 and the L2P segments 630 on the buffer 600, and checks the P21 segments 610 and the L2P segments 630 loaded on the buffer 600, thus checking valid pages among the N+1 number of pages included in the memory block 1 650. Thereafter, the controller 130 generates a bitmap corresponding to all valid pages included in the memory block 1 650, and discards the P2L segments 610 and the L2P segments 630 that have been loaded on the buffer 600. Furthermore, the controller 130 of the memory system in accordance with another embodiment loads data segments 640 of the valid pages corresponding to the bit map on the buffer 600, stores the data segments 640 loaded on the buffer 600, in pages of the memory block i 660 that is a target memory block. Then, the controller 130 loads the L2P segments 630 of map data, e.g., the first map data, for the data segments 640 of the valid pages corresponding to the bit map, on the buffer 630 again, updates the L2P segments 630 of the first map data loaded on the buffer 630, and then stores the updated L2P segments 630 of the first map data in pages of the memory block i 660 that is the target memory block. In the memory system in accordance with another embodiment, if power off occurs while the garbage collection operation for the memory device 150 is performed, the garbage collection operation is performed from an initial operation when the memory system is powered on.

Therefore, as described in the memory system in accordance with the present embodiment, it is desirable that the garbage collection operation be performed on a valid page basis. That is, in the memory system in accordance with the embodiment, as described above, after it is checked whether a valid page is present in each of the pages included in the source memory block, a data segment of valid data stored in the valid page is loaded on the buffer 600 without generating a bitmap corresponding to the valid page, and a map segment of map data corresponding to the data segment loaded on the buffer 600 is updated, and thereafter the data segment loaded on the buffer 600 and the updated map segment are stored in a page included in the target memory block.

Furthermore, in the memory system in accordance with the embodiment, because the garbage collection operation is performed on a valid page basis, a checkpoint instructing start and completion for the garbage collection operation is included in the target memory block by valid pages. That is, as described above, as a data segment stored in each valid page, an L2P segment of first map data for the data segment, and a P2L segment for the target memory block are stored in pages included in the target memory block by valid pages, the segments stored in the pages of the target memory block become checkpoints instructing start and completion of a storage operation for valid data of the source memory block. Therefore, in the memory system in accordance with the embodiment, as the garbage collection operation for the source memory block is performed on a valid page basis, the garbage collection operation for the memory device 150 can be more rapidly and efficiently performed. Hereinafter, the operation of processing data in the memory system in accordance with an embodiment will be described in detail with reference to FIG. 7.

Figure 7:
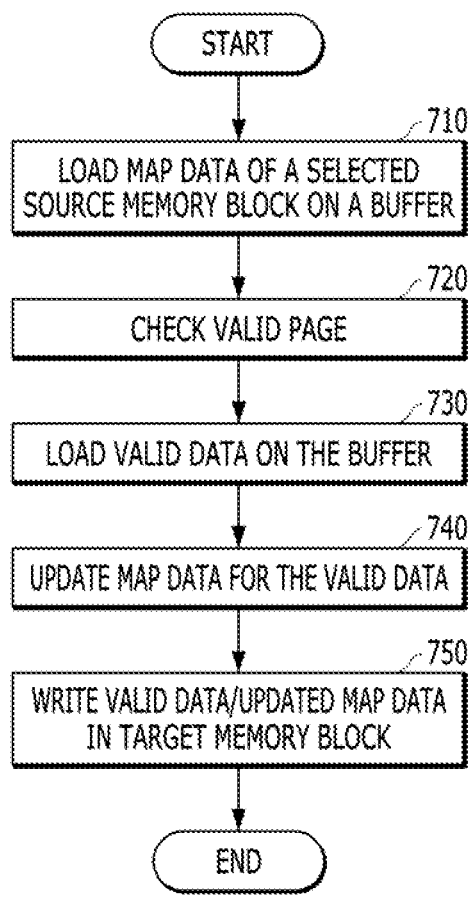
FIG. 7 is a diagram schematically illustrating an operating process for processing data in a memory system in accordance with an embodiment.

FIG. 7 is a diagram schematically illustrating an operating process of processing data in the memory system in accordance with an embodiment of the present invention Referring to FIG. 7, to perform the garbage collection operation for the memory device 150, at step 710 the memory system loads map data for data stored in a plurality of pages of a selected source memory block, on a buffer of the memory system. The map data may include first map data and second map data as described above. The buffer may be a buffer of a memory 144 of the controller 130 of the memory system 110 of FIG. 1. The memory system 110 may select the source memory block and a target memory block among the plurality of memory blocks included in the memory device 150 as described above.

At step 720, the memory system determines the valid pages by checking the first map data and the second map data for the plurality of pages included in the source memory block.

Thereafter, at step 730, the memory system loads the valid data stored in the valid pages of the source memory block, on the buffer. That is, the memory system loads valid data stored in the valid page of the source memory block on the buffer. The memory system updates, at step 740, map data for the valid data which are loaded on the buffer.

At step 750, the memory system writes and stores the valid data loaded on the buffer and the updated map data in pages included in the target memory block. The target memory block may be selected as described above.

The detailed description with reference to FIGS. 5 and 6 have been provided for the garbage collection operation for the memory blocks of the memory device. Particularly, the operations of loading the map data on the buffer to check a valid page among the plurality of pages included in the source memory block among the memory blocks, and performing the garbage collection operation on a valid page basis have been described. For example, the described operations include loading the P2L segments of the second map data for the source memory block, loading the L2P segments of the first map data for the loaded P2L segments, checking the valid page in the source memory block through the P2L segments and the L2P segments, and then performing the garbage collection operation on a valid page basis. In other words, the described operations include loading valid data stored in the valid page, on the buffer, updating the map data for the loaded valid data, and storing the loaded valid data and the updated map data in the target memory block. Therefore, further detailed description thereof will be omitted. Hereinbelow, detailed descriptions will be made with reference to FIGS. 8 to 13, for a data processing system and electronic appliances to which the memory system 110 including the memory device 150 and the controller 130 described above with reference to FIGS. 1 to 7, according to the embodiment, is applied.

Figure 8:
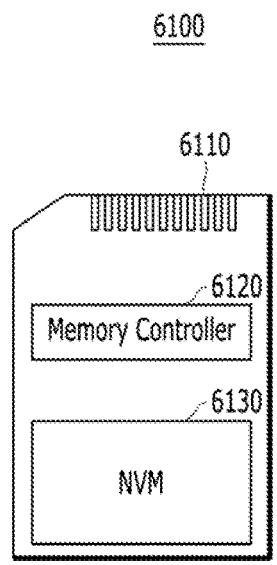
FIGS. 8 to 13 are diagrams illustrating examples of memory systems according to embodiments of the present invention.

FIG. 8 is a diagram illustrating a data processing system including the memory system according to the embodiment. FIG. 8 is a drawing schematically illustrating a memory card system to which the memory system according to an embodiment is applied.

Referring to FIG. 8, a memory card system 6100 includes a memory controller 6120, a memory device 6130, and a connector 6110.

In detail, the memory controller 6120 may be connected with the memory device 6130 and may access the memory device 6130. In some embodiments, the memory device 6130 may be implemented with a nonvolatile memory (NVM). For example, the memory controller 6120 may control read, write, erase and background operations for the memory device 6130. The memory controller 6120 may provide an interface between the memory device 6130 and a host (not shown), and may drive a firmware for controlling the memory device 6130. For example, the memory controller 6120 may correspond to the controller 130 in the memory system 110 described above with reference to FIG. 1, and the memory device 6130 may correspond to the memory device 150 in the memory system 110 described above with reference to FIG. 1.

Therefore, the memory controller 6120 may include components such as a random access memory (RAM), a processing unit, a host interface, a memory interface and an error correction unit as shown in FIG. 1.

The memory controller 6120 may communicate with an external device (for example, the host 102 described above with reference to FIG. 1), through the connector 6110. For example, as described above with reference to FIG. 1, the memory controller 6120 may be configured to communicate with the external device through at least one of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (ESDI), Integrated Drive Electronics (IDE), Firewire, universal flash storage (UFS), wireless-fidelity (WI-FI) and Bluetooth. Accordingly, the memory system and the data processing system according to the embodiment may be applied to wired/wireless electronic appliances, For example, a mobile electronic appliance.

The memory device 6130 may be implemented with a nonvolatile memory. For example, the memory device 6130 may be implemented with various nonvolatile memory devices such as an electrically erasable and programmable ROM (EPROM), a NAND flash memory, a NOR flash memory, a phase-change RAM (PRAM), a resistive RAM (ReRAM), a ferroelectric RAM (FRAM) and a spin torque transfer magnetic RAM (STT-MRAM).

The memory controller 6120 and the memory device 6130 may be integrated into a single semiconductor device. For example, the memory controller 6120 and the memory device 6130 may construct a solid state driver (SSD) by being integrated into a single semiconductor device. The memory controller 6120 and the memory device 6130 may construct a memory card such as a PC card (PCMCIA: Personal Computer Memory Card International Association), a compact flash card (CF), a smart media card (SM and SMC), a memory stick, a multimedia card (MMC, RS-MMC, MMCmicro and eMMC), an SD card (e.g., SD, miniSD, microSD and SDHC) and a universal flash storage (UFS).

Figure 9:
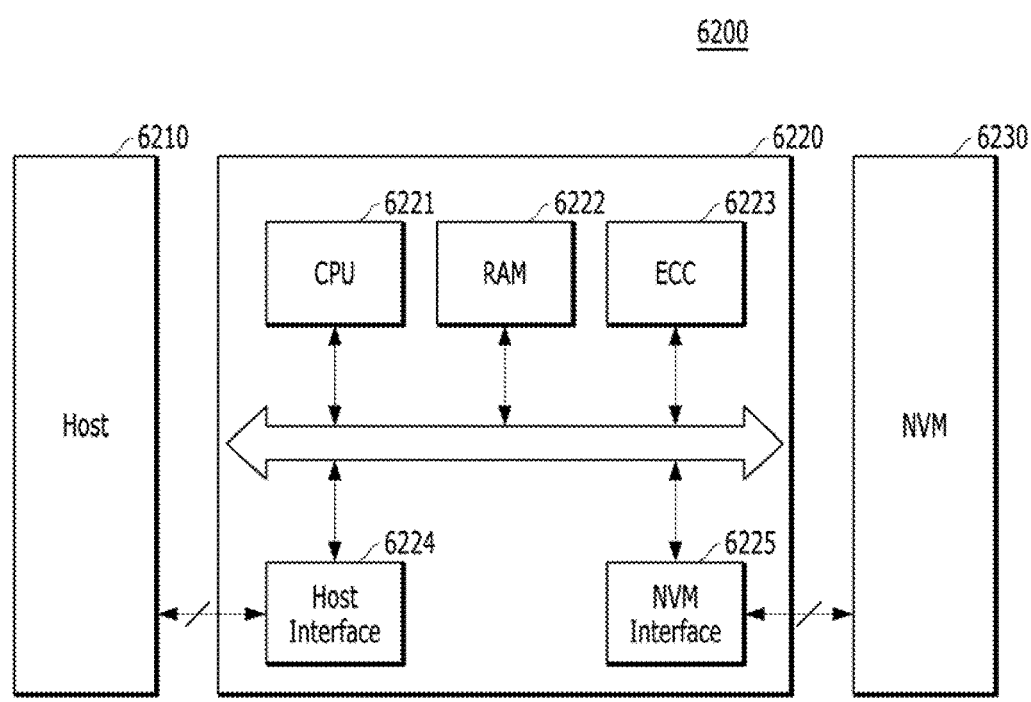

FIG. 9 is a diagram schematically illustrating an example of a data processing system including a memory system according to an embodiment of the present invention.

Referring to FIG. 9, a data processing system 6200 includes a memory device 6230 which may be implemented with at least one nonvolatile memory (NVM) and a memory controller 6220 for controlling the memory device 6230. The data processing system 6200 may be a storage medium such as a memory card (e.g., CF, SD and microSD), as described above with reference to FIG. 1. The memory device 6230 may correspond to the memory device 150 in the memory system 110 described above with reference to FIG. 1, and the memory controller 6220 may correspond to the controller 130 in the memory system 110 described above with reference to FIG. 1.

The memory controller 6220 may control the operations, including the read, write and erase operations for the memory device 6230 in response to requests received from a host 6210. The memory controller 6220 may include a central processing unit (CPU) 6221, a random access memory (RAM) as a buffer memory 6222, an error correction code (ECC) circuit 6223, a host interface 6224, and an NVM interface as a memory interface 6225, all coupled via an internal bus.

The CPU 6221 may control the operations for the memory device 6230 such as read, write, file system management, bad page management, and so forth. The RAM 6222 may operate according to control of the CPU 6221, and may be used as a work memory, a buffer memory, a cache memory, or the like. In the case where the RAM 6222 is used as a work memory, data processed by the CPU 6221 is temporarily stored in the RAM 6222. In the case where the RAM 6222 is used as a buffer memory, the RAM 6222 is used to buffer data to be transmitted from the host 6210 to the memory device 6230 or from the memory device 6230 to the host 6210. In the case where the RAM 6222 is used as a cache memory, the RAM 6222 may be used to enable the memory device 6230 with a low speed to operate at a high speed.

The ECC circuit 6223 corresponds to the ECC unit 138 of the controller 130 described above with reference to FIG. 1. As described above with reference to FIG. 1, the ECC circuit 6223 may generate an error correction code (ECC) for correcting a fail bit or an error bit in the data received from the memory device 6230. The ECC circuit 6223 may perform error correction encoding for data to be provided to the memory device 6230, and may generate data added with parity bits. The parity bits may be stored in the memory device 6230. The ECC circuit 6223 may perform error correction decoding for data outputted from the memory device 6230. At this time, the ECC circuit 6223 may correct errors by using the parity bits. For example, as described above with reference to FIG. 1, the ECC circuit 6223 may correct errors by using various coded modulations such as of a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM) and a Block coded modulation (BCM).

The memory controller 6220 transmits and receives data to and from the host 6210 through the host interface 6224, and transmits and receives data to and from the memory device 6230 through the NVM interface 6225. The host interface 6224 may be connected with the host 6210 through at least one of various interface protocols such as a parallel advanced technology attachment (PATA) bus, a serial advanced technology attachment (SATA) bus, a small computer system interface (SCSI), a universal serial bus (USB), a peripheral component interconnection express (PCIe) or a NAND interface. Further, as a wireless communication function or a mobile communication protocol such as wireless fidelity (WI-FI) or long term evolution (LTE) is realized, the memory controller 6220 may transmit and receive data by being connected with an external device such as the host 6210 or another external device other than the host 6210. Specifically, as the memory controller 6220 is configured to communicate with an external device through at least one among various communication protocols, the memory system and the data processing system according to the embodiment may be applied to wired/wireless electronic appliances, For example, a mobile electronic appliance.

Figure 10:
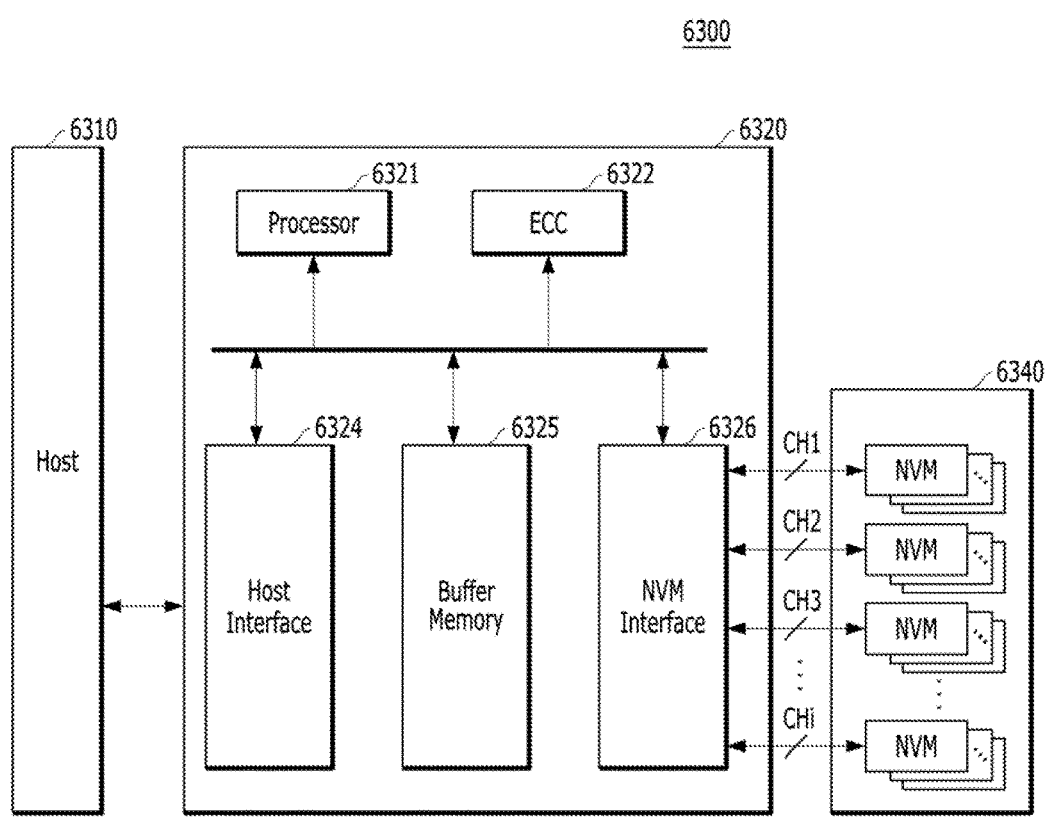

FIG. 10 is a diagram illustrating an example of a data processing system including a memory system according to an embodiment of the invention. FIG. 10 may be a solid state drive (SSD).

Referring to FIG. 10, an SSD 6300 may include a memory device 6340 which may include a plurality of nonvolatile memories NVM, and a controller 6320. The controller 6320 may correspond to the controller 130 in the memory system 110 described above with reference to FIG. 1, and the memory device 6340 may correspond to the memory device 150 in the memory system 110 described above with reference to FIG. 1.

In detail, the controller 6320 may be connected with the memory device 6340 through a plurality of channels CH1, CH2, CH3, . . . and CHi. The controller 6320 may include a processor 6321, a buffer memory 6325, an error correction code (ECC) circuit 6322, a host interface 6324, and a nonvolatile memory (NVM) interface as a memory interface 6326 coupled via an internal bus.

The buffer memory 6325 temporarily stores data received from a host 6310 or data received from a plurality of nonvolatile memories NVMs included in the memory device 6340, or temporarily stores metadata of the plurality of nonvolatile memories NVMs. For example, the metadata may include map data including mapping tables. The buffer memory 6325 may be implemented with a volatile memory such as, but not limited to, a dynamic random access memory (DRAM), a synchronous dynamic random access memory (SDRAM), a double data rate (DDR) SDRAM, a low power double data rate (LPDDR) SDRAM and a graphic random access memory (GRAM) or a nonvolatile memory such as, but not limited to, a ferroelectric random access memory (FRAM), a resistive random access memory (ReRAM), a spin-transfer torque magnetic random access memory (STT-MRAM) and a phase change random access memory (PRAM). While it is illustrated in FIG. 10, for the sake of convenience in explanation, that the buffer memory 6325 is disposed inside the controller 6320, it is to be noted that the buffer memory 6325 may be disposed outside the controller 6320.

The ECC circuit 6322 calculates error correction code values of data to be programmed in the memory device 6340 in a program operation, performs an error correction operation for data read from the memory device 6340, based on the error correction code values, in a read operation, and performs an error correction operation for data recovered from the memory device 6340 in a recovery operation for failed data.

The host interface 6324 provides an interface function with respect to an external device such as the host 6310. The nonvolatile memory interface 6326 provides an interface function with respect to the memory device 6340 which is connected through the plurality of channels CH1, CH2, CH3, . . . and CHi.

As a plurality of SSDs 6300 to each of which the memory system 110 described above with reference to FIG. 1 is applied are used, a data processing system such as a redundant array of independent disks (RAID) system may be implemented. In the RAID system, the plurality of SSDs 6300 and an RAID controller for controlling the plurality of SSDs 6300 may be included. In the case of performing a program operation by receiving a write command from the host 6310, the RAID controller may select at least one memory system (For example, at least one SSD 6300) in response to the RAID level information of the write command received from the host 6310, among a plurality of RAID levels (for example, the plurality of SSDs 6300) and may output data corresponding to the write command, to the selected SSD 6300. In the case of performing a read operation by receiving a read command from the host 6310, the RAID controller may select at least one memory system (For example, at least one SSD 6300) in response to the RAID level information of the write command received from the host 6310, among the plurality of RAID levels (for example, the plurality of SSDs 6300), and may provide data outputted from the selected SSD 6300, to the host 6310.

Figure 11:
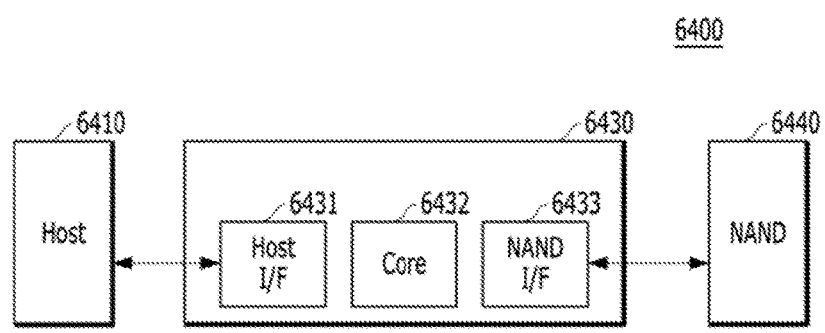

FIG. 11 is a diagram illustrating another example of a data processing system including the memory system according to an embodiment of the present invention. FIG. 11 is a drawing schematically illustrating an embedded multimedia card (eMMC) to which a memory system according to an embodiment is applied.

Referring to FIG. 11, an eMMC 6400 includes a memory device 6440 which is implemented with at least one NAND flash memory, and a controller 6430. The controller 6430 may correspond to the controller 130 in the memory system 110 described above with reference to FIG. 1, and the memory device 6440 may correspond to the memory device 150 in the memory system 110 described above with reference to FIG. 1.

In detail, the controller 6430 may be connected with the memory device 6440 through a plurality of channels. The controller 6430 may include a core 6432, a host interface 6431, and a memory interface such as a NAND interface 6433.

The core 6432 may control the operations of the eMMC 6400. The host interface 6431 may provide an interface function between the controller 6430 and a host 6410. The NAND interface 6433 may provide an interface function between the memory device 6440 and the controller 6430. For example, the host interface 6431 may be a parallel interface such as an MMC interface, as described above with reference to FIG. 1, or a serial interface such as an ultra-high speed class 1 (UHS-I)/UHS class 2 (UHS-II) and a universal flash storage (UFS) interface.

Figure 12:
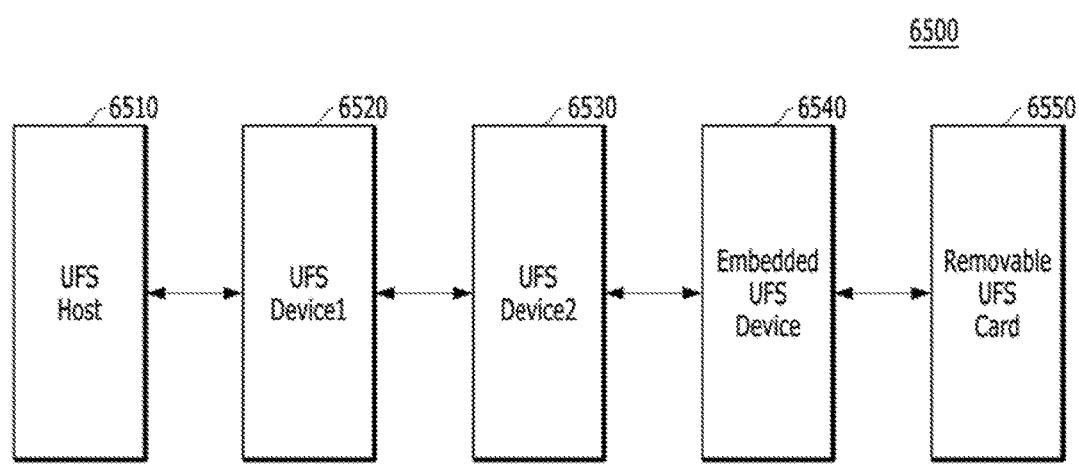

FIG. 12 is a diagram illustrating another example of a data processing system including a memory system according to an embodiment of the present invention. FIG. 11 is a drawing schematically illustrating a universal flash storage (UFS) to which the memory system according to the embodiment is applied.

Referring to FIG. 12, a UFS system 6500 may include a UFS host 6510, a plurality of UFS devices 6520 and 6530, an embedded UFS device 6540, and a removable UFS card 6550. The UFS host 6510 may be an application processor of wired/wireless electronic appliances, for example, a mobile electronic appliance.

The UFS host 6510, the UFS devices 6520 and 6530, the embedded UFS device 6540 and the removable UFS card 6550 may respectively communicate with external devices such as wired/wireless electronic appliances (for example, a mobile electronic appliance), through a UFS protocol. The UFS devices 6520 and 6530, the embedded UFS device 6540 and the removable UFS card 6550 may be implemented with the memory system 110 described above with reference to FIG. 1, for example, as the memory card system 6100 described above with reference to FIG. 8. The embedded UFS device 6540 and the removable UFS card 6550 may communicate through another protocol other than the UFS protocol. For example, the embedded UFS device 6540 and the removable UFS card 6550 may communicate through various card protocols such as, but not limited to, USB flash drives (UFDs), multimedia card (MMC), secure digital (SD), mini SD and Micro SD.

Figure 13:
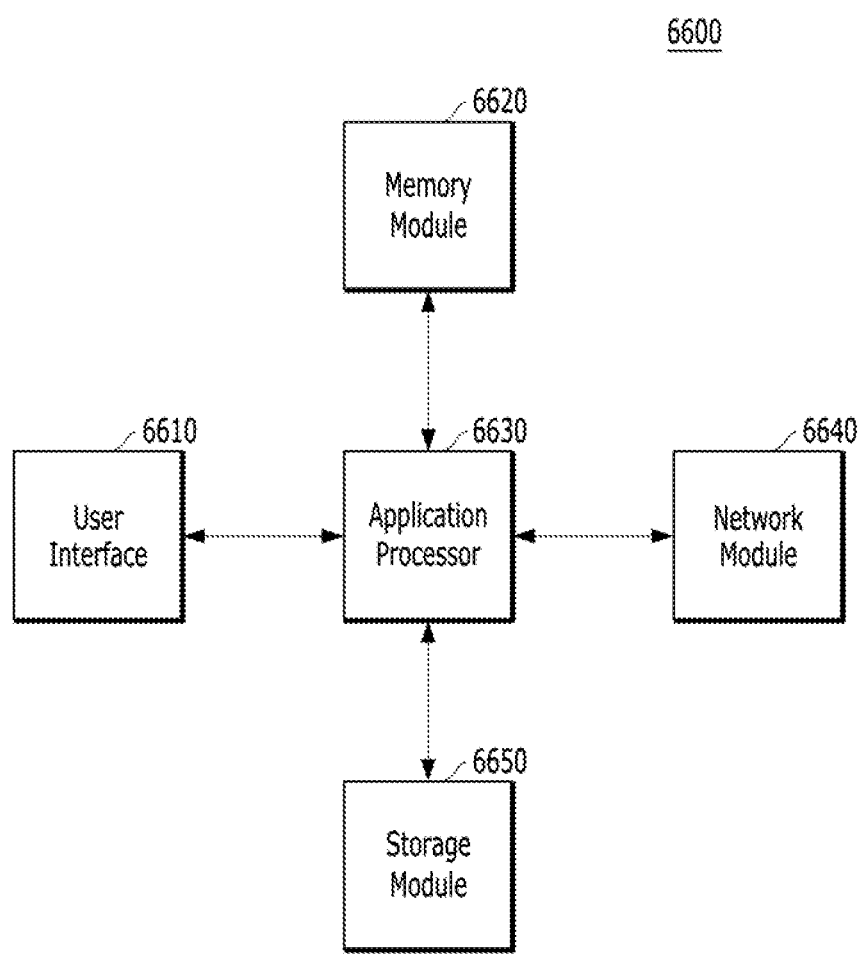

FIG. 13 is a diagram illustrating an example of a data processing system including the memory system according to an embodiment of the present invention. FIG. 13 is a drawing schematically illustrating a user system to which the memory system according to the embodiment is applied.

Referring to FIG. 13, a user system 6600 may include an application processor 6630, a memory module 6620, a network module 6640, a storage module 6650, and a user interface 6610.

The application processor 6630 may drive components included in the user system 6600 and an operating system (OS). For example, the application processor 6630 may include controllers for controlling the components included in the user system 6600, interfaces, graphics engines, and so on. The application processor 6630 may be provided by a system-on-chip (SoC).

The memory module 6620 may operate as a main memory, a working memory, a buffer memory or a cache memory of the user system 6600. The memory module 6620 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM and an LPDDR3 SDRAM or a nonvolatile random access memory such as a phase change random access memory (PRAM), a resistive random access memory (ReRAM), a magnetic random access memory (MRAM) and a ferroelectric random access memory (FRAM). For example, the application processor 6630 and the memory module 6620 may be mounted by being packaged on the basis of a package-on-package (POP).

The network module 6640 may communicate with external devices. For example, the network module 6640 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WIMAX), wireless local area network (WLAN), ultra-wideband (UWB), Bluetooth, wireless display (WI-DI), and so on, and may thereby communicate with wired/wireless electronic appliances, For example, a mobile electronic appliance. According to this fact, the memory system and the data processing system according to the embodiment may be applied to wired/wireless electronic appliances. The network module 6640 may be included in the application processor 6630.

The storage module 6650 may store data such as data received from the application processor 6530, and transmit data stored therein, to the application processor 6530. The storage module 6650 may be realized by a nonvolatile semiconductor memory device such as a phase-change RAM (PRAM), a magnetic RAM (MRAM), a resistive RAM (ReRAM), a NAND flash memory, a NOR flash memory and a 3-dimensional NAND flash memory. The storage module 6650 may be provided as a removable storage medium such as a memory card of the user system 6600 and an external drive. For example, the storage module 6650 may correspond to the memory system 110 described above with reference to FIG. 1, and may be implemented with the SSD, eMMC and UFS described above with reference to FIGS. 10 to 12.

The user interface 6610 may include interfaces for inputting data or commands to the application processor 6630 or for outputting data to an external device. For example, the user interface 6610 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, a light emitting diode (LED), a speaker and a motor.

In the case where the memory system 110 described above with reference to FIG. 1 is applied to the mobile electronic appliance of the user system 6600 according to an embodiment, the application processor 6630 may control the operations of the mobile electronic appliance, and the network module 6640 as a communication module may control wired/wireless communication with an external device, as described above. The user interface 6610 as the display/touch module of the mobile electronic appliance displays data processed by the application processor 6630 or supports input of data from a touch panel.

The memory system and the operating method thereof according to the embodiments may minimize complexity and performance deterioration of the memory system and maximize use efficiency of a memory device, thereby quickly and stably process data with respect to the memory device.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
   a memory device including a plurality of memory blocks; and
   a controller including a memory, the controller being suitable for:
      selecting a source memory block and a target memory block among the plurality of memory blocks;
      loading map segments of map data for the source memory block on the memory;
      determining valid pages, among a plurality of pages included in the source memory block, through the map segments;
      loading valid data stored in the valid pages on the memory;
      updating map data for the valid data; and
      storing the valid data and the updated map data in a plurality of pages included in the target memory block,
   wherein the controller loads map segments of second map data for the plurality of pages of the source memory block, and map segments of first map data for the map segments of the second map data, on the memory,
   wherein the controller determines the map segments of the second map data and the map segments of the first map data that are loaded on the memory, and determines the valid pages in the source memory block, and
   wherein the controller loads a first data segment stored in a first valid page among the valid pages, on the memory, and updates a first map segment corresponding to the first data segment, among the map segments of the first map data loaded on the memory.

2. The memory system according to claim 1, wherein the controller updates, among the map segments of the first map data loaded on the memory, a map segment corresponding to the valid data, and stores the valid data and the updated map segment in the plurality of pages of the target memory block.

3. The memory system according to claim 2, wherein the controller determines the storage of the valid data in the plurality of pages of the target memory block, and updates, in response to the storage of the valid data, a map segment corresponding to the valid data.

4. The memory system according to claim 2, wherein the controller determines the storage of the valid data and the updated map segment to the plurality of pages of the target memory block, and stores, in response to the storage of the valid data and the map segment, map segments of second map data for the plurality of pages of the target memory block, in the plurality of pages of the target memory block.

5. The memory system according to claim 1, wherein the controller stores the first data segment loaded on the memory, in a first page of the target memory block, stores the updated first map segment in a second page of the target memory block, and stores a second map segment corresponding to the storage of the first page and the second page, in a third page of the target memory block.

6. The memory system according to claim 5, wherein the first page, the second page and the third page are checkpoints indicating start and completion of the storage of the first data segment from the source memory block to the target memory block.

7. The memory system according to claim 6, wherein, in the case where, after power off has occurred, the memory system is powered on, the controller determines, through the checkpoints, whether a second page subsequent to the first valid page, among the plurality of pages of the source memory block, is a valid page.

8. An operating method of a memory system including a controller and a memory device, comprising:
   selecting a source memory block and a target memory block among a plurality of memory blocks included in the memory device;
   loading map segments of map data for the source memory block on a memory included in the controller;
   determining, through the map segments, valid pages among a plurality of pages included in the source memory block;
   loading valid data stored in the valid pages, on the memory;
   updating map data for the valid data; and
   storing the valid data and the updated map data, in a plurality of pages included in the target memory block,
   wherein the loading of the map segments on the memory comprises:
      loading map segments of second map data for the plurality of pages of the source memory block, on the memory; and
      loading map segments of first map data for the map segments of the second map data, on the memory,
   wherein the determining of the valid pages comprises determining the map segments of the second map data and the map segments of the first map data that are loaded on the memory, and determining the valid pages in the source memory block,
   wherein the loading of the map segments on the memory comprises loading a first data segment stored in a first valid page among the valid pages, on the memory, and
   wherein the updating comprises updating a first map segment corresponding to the first data segment, among the map segments of the first map data loaded on the memory.

9. The operating method according to claim 8,
   wherein the updating comprises updating, among the map segments of the first map data loaded on the memory, a map segment corresponding to the valid data, and
   wherein the storing comprises storing the valid data and the updated map segment in the plurality of pages of the target memory block.

10. The operating method according to claim 9, wherein the updating comprises:
   determining the storage of the valid data in the plurality of pages of the target memory block; and
   updating, in response to the storage of the valid data, the map segment corresponding to the valid data.

11. The operating method according to claim 9, further comprising:
   determining the storage of the valid data and the updated map segment in the plurality of pages of the target memory block; and
   storing, in response to the storage of the valid data and the map segment, map segments of second map data for the plurality of pages of the target memory block, in the plurality of pages of the target memory block.

12. The operating method according to claim 8, wherein the storing comprises:
   storing the first data segment loaded on the memory, in a first page of the target memory block;
   storing the updated first map segment in a second page of the target memory block; and
   storing a second map segment corresponding to the storage of the first page and the second page, in a third page of the target memory block.

13. The operating method according to claim 12, wherein the first page, the second page and the third page are checkpoints indicating start and completion of the storage of the first data segment from the source memory block to the target memory block.

14. The operating method according to claim 13, further comprising:
   determining, in the case where, after power off has occurred, the memory system is powered on, whether a second page subsequent to the first valid page, among the plurality of pages of the source memory block, is a valid page, through the checkpoints.

\* \* \* \* \*